United States Patent [19]

Damen

[11] 4,438,840
[45] Mar. 27, 1984

[54] APPARATUS FOR SELECTING CLOSURES

[75] Inventor: Franciscus A. Damen, Langeweg, Netherlands

[73] Assignee: Flessluittechniek B. V. Handelend Onder De Naam Calumatic, Dongen, Netherlands

[21] Appl. No.: 350,200

[22] Filed: Feb. 19, 1982

[30] Foreign Application Priority Data

Feb. 27, 1981 [NL] Netherlands .......................... 8100966

[51] Int. Cl.³ ............................................ B65G 47/24
[52] U.S. Cl. .................................... 198/398; 198/625
[58] Field of Search ............... 198/398, 399, 388, 625; 221/157, 159, 160, 161, 162

[56] References Cited

U.S. PATENT DOCUMENTS

| 1,347,215 | 7/1920 | Eby | 209/659 |
| 1,533,523 | 4/1925 | Thoma | 221/157 |
| 1,980,815 | 11/1934 | McBean | 209/542 |
| 2,336,606 | 12/1943 | Everett | 198/390 |
| 3,811,551 | 5/1974 | Eddy | 198/398 |
| 3,863,757 | 2/1975 | Kinney | 198/399 |
| 4,281,758 | 8/1981 | Adamski et al. | 198/398 |

FOREIGN PATENT DOCUMENTS

| 453052 | 11/1927 | Fed. Rep. of Germany | 198/399 |
| 2256418 | 11/1972 | Fed. Rep. of Germany . | |
| 6617477 | 7/1967 | Netherlands . | |
| 718332 | 2/1980 | U.S.S.R. | 198/399 |

Primary Examiner—Joseph E. Valenza
Assistant Examiner—Jonathan D. Holmes
Attorney, Agent, or Firm—Leydig, Voit, Osann, Mayer & Holt, Ltd.

[57] ABSTRACT

An apparatus for selecting closures with a cylindrical raised edge out of a supply of closures present in one plane with the back to the one or the other side. The apparatus has a hopper that in cross section is rectangular with mutually spaced side walls between which the closures fit, side edges and a lower sloping edge having an opening below which a first worm extends parallel to the lower edge. The first worm has a curved profile in which said raised edge of the closure fits. A side wall adjoining the opening of the lower wall has an opening in which a cylindrical shaft is present with its outer face tangential to the plane of the side wall and extends parallel to and is driven synchronously by the first worm in the same direction. The shaft extends with the worm until outside the side wall and merges into a second worm with the same pitch and has a width of thread that is substantially smaller than the inner diameter of the raised edge of the closure such that the first worm discharges the closures that are not correctly oriented.

1 Claim, 4 Drawing Figures

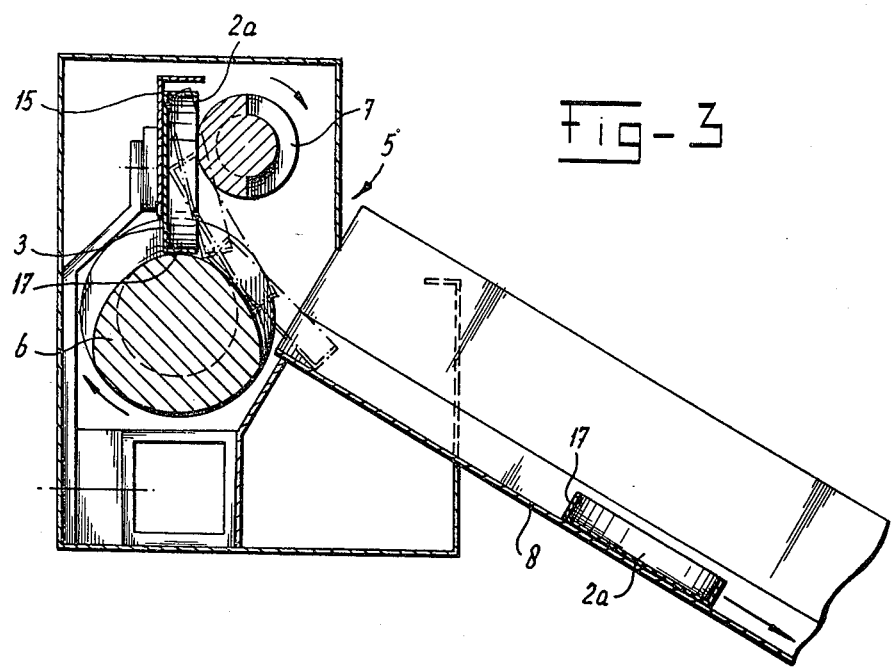
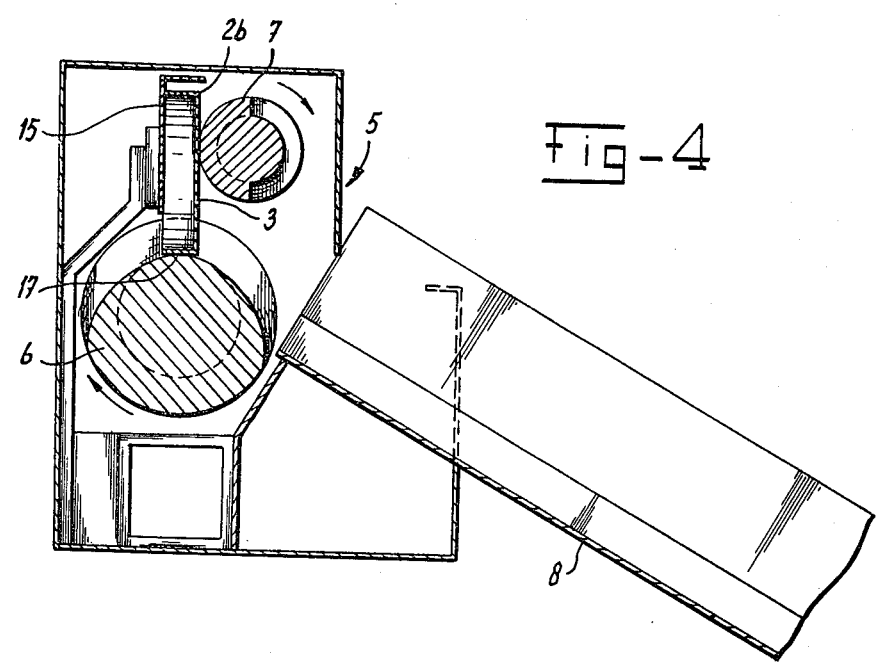

APPARATUS FOR SELECTING CLOSURES

The invention is related to an apparatus for selecting closures out of a supply of the closures in which they are present in one plane with the back directed to the one side or the other side, which closures have a cylindrical raised edge.

To an apparatus for closing containers, such as for instance jars of bottles, the closures, that are designed as a back with raised edge, have to be supplied in such a manner that the apparatus is able to take up the closures and to position them on the containers. This supply takes place by means of the selecting device. Such a device is known in several designs and types.

The invention now aims to provide a device for selecting closures that takes little space, is not susceptible for technical troubles and is not expensive concerning construction and maintenance.

According to the invention this aim is attained by the fact that the apparatus has a hopper that in cross section is rectangular and is provided with side walls that are mutually spaced in such a manner that the closures fit between them and also with side edges and a lower edge, which lower edge slopes and is provided with an opening below which a first worm is present extending parallel to the lower edge and has a profile with a curvature in which the raised edge of the closure fits and a side wall of the container adjoining the opening of the lower wall has an opening in which a cylindrical shaft is present of which the outer face is tangential to the plane of this side wall, and extends parallel to the worm and is driven by this synchronically, which shaft extends with the worm until outside the side wall of the container and there merges into a second worm with the same pitch and with a width of thread that is substantially smaller than the inner diameter of the raised edge of the closure, in which the worm and the shaft are driven in the same rotational direction in such a manner that the worm the closures that are not correctly oriented and that do not find support on the second worm between them in such a manner that the back of the second worm is opposite to the cavity of the profile of the first worm.

The closures to be selected are supplied to a container of the above described shape and execution. The closures subsequently move through the opening with their back to the one side or the other and come to rest with their raised edge in the profile of the first worm. By rotating this worm the closures are carried away by the profile while guided by said shaft. At the moment that this shaft merges into said second worm then the closures, of which the back is directed away from this second worm, loose their guiding support, tilt and are carried back to said hopper. The closures of which the back is directed to the second worm are moved on by engagement of the profile of this second worm with the back of the closure to a closing machine. The profile of the second worm then does not engage the space in the closure but cooperates with the outer side of the back directed thereto.

The closures so are discharged or passed through dependent on the orientation of their back.

It will be clear that a device is provided that fulfils the above mentioned requirements.

With the aid of a drawing, in which an embodiment is shown, the invention now will be described in detail.

FIG. 3 shows a section along the line III—III in FIG. 2 in which the back of the closure is directed from the second worm.

FIG. 4 shows the same section as FIG. 3 in which the back of the closure is directed to the second worm.

Figure 1:
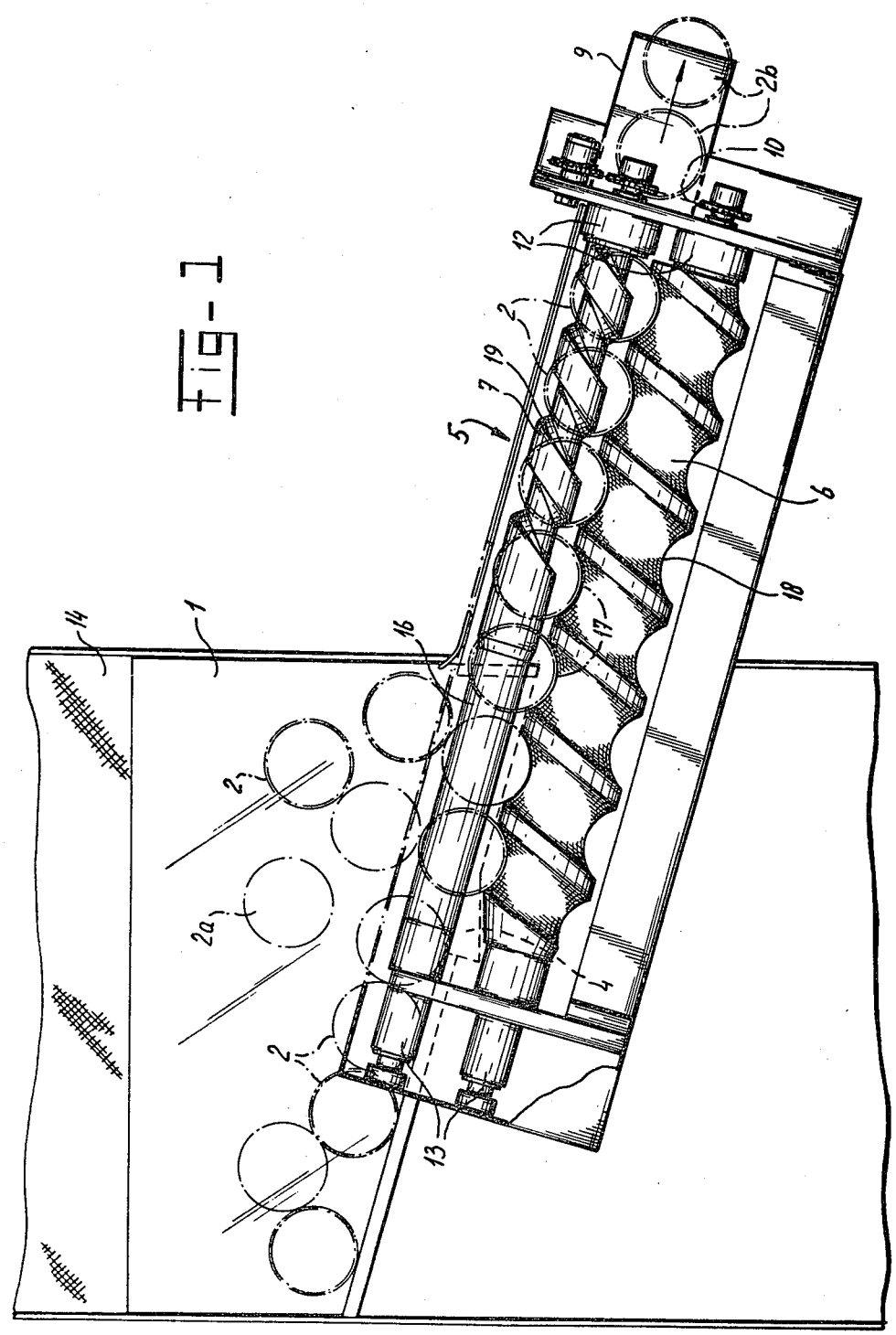
FIG. 1 shows schematically a side view partly in section.

From a hopper 1 closures 2, with their back 3 directed to the one or the other side, are supplied through an opening 4 to the selecting device (in general indicated by 5).

The selecting device comprises a first worm 6 and a second worm 7. The not correctly oriented closures 2a are discharged from the device to a trough 8 and the correctly oriented closures are passed to a trough 9 and come into a closing machine not shown. The worms 6 and 7 are driven in the same direction via the chain drive 10 by the motor 11 and are supported at 12 and 13 in the frame of the device.

Figure 2:
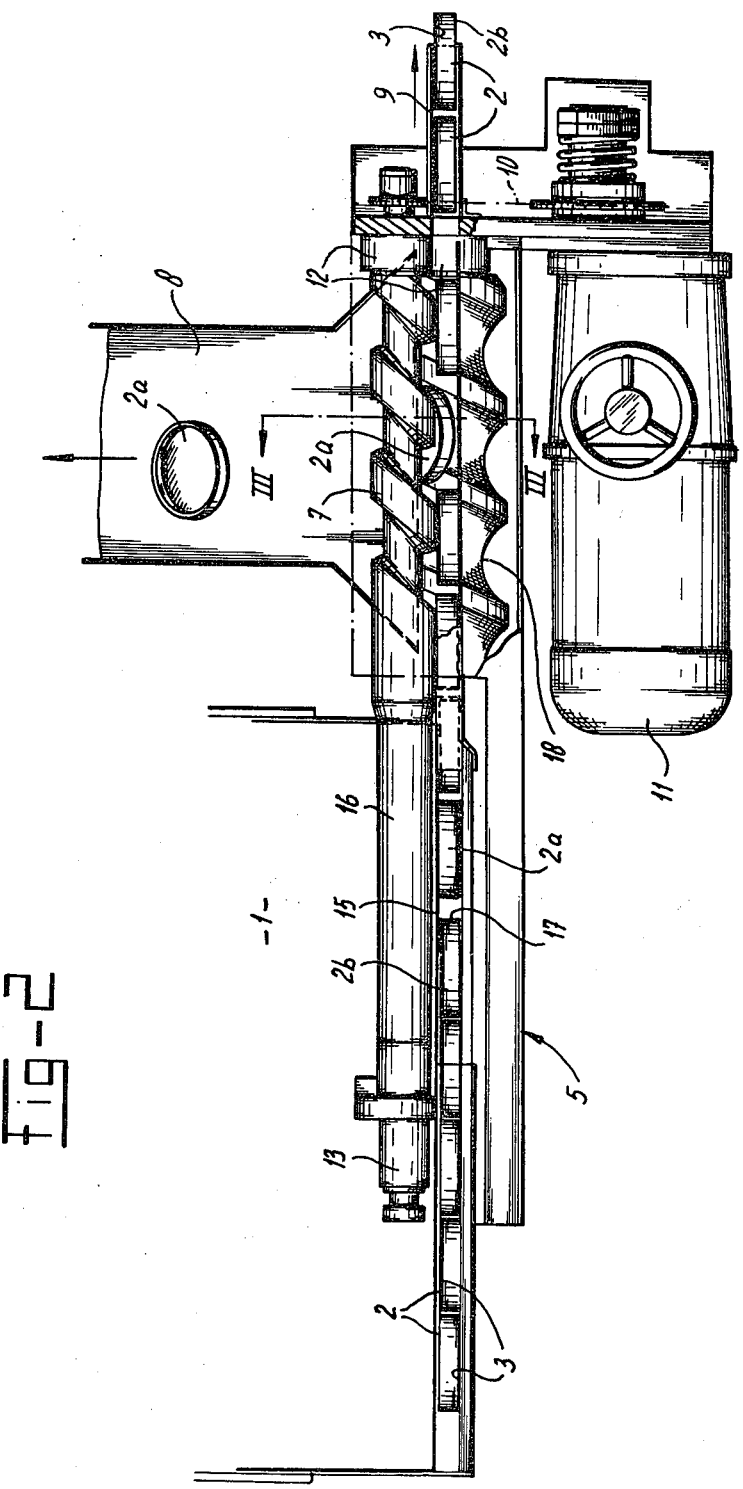
FIG. 2 shows a view from above partly in section.

More in particular the closures 2 are taken up from the hopper, not shown by a conveyor belt 14 and put into the container 1 that is rectangular in section, which container has a height corresponding to that of the closures 2 in such a manner that the closures in the hopper only can move in their own plane to the opening 4. Then they come between a wall part 15 of the hopper 1 and the shaft part 16 of the second worm. With their cylindrical raised edge 17 they arrive in the profile 18 of the first worm and in case the device works are conveyed to the right as seen in FIG. 1. The backs of the closures 2 are then directed to the left, as indicated in FIG. 2 and to the right as indicated in FIG. 4. By further conveying to the right (FIG. 1) the closures pass the shaft part 16 of the worm 7 and they come between the worm 7 and the wall part 15, which worm is provided with a rectangular worm profile 19 present opposite the profile cavity 18 of the first worm and has a pitch-width that is substantially smaller then the inner diameter of the raised edge of the closure. Because of the fact that the back 3 of the closure 2 is directed from the worm 7, this worm 7 cannot engage the back 3 of the closure and tilts the cover as indicated in FIG. 3 as result of the rotation of the worm 6. The closure 2a arrives in the discharge trough 8 and is conveyed back.

As indicated in FIG. 4 the closure 2b that is directed with its back to the worm 7 comes into engagement with this worm, so cannot tilt, is moved by the first worm 7 from the left to the right seen in FIG. 1 and comes in the trough 9 and is thereby discharged to the closing machine.

It will be clear that within the reach of the claims other executions of details are possible.

I claim:

1. The apparatus for selecting closures out of a supply of closures in which they are present in one plane with the back to one or the other side, which closures have a cylindrical raised edge comprising:
    a hopper that in cross section is rectangular and is provided with side walls that are mutually spaced in such a manner that the closures fit therebetween, said hopper also having side edges and a lower wall, which lower wall slopes and is provided with an opening,
    a first worm disposed below said opening and extending parallel to the lower wall of said hopper and having a profile with a curvature in which the raised edges of the closure fit, and a side wall of the hopper adjoining the opening of the lower wall having an opening, a cylindrical shaft extending into said side wall opening and having an outer face tangential to the plane of this side wall, and extending parallel to said first worm and driven by said first worm synchronously, which shaft extends with said first worm until outside the side wall of the hopper, a second worm merging with said shaft and having the same pitch and with a width of thread that is substantially smaller than the inner diameter of the raised edge of the closures, the back of said second worm being opposite to the cavity of the profile of the first worm, the first worm and the shaft are driven in the same rotational direction in such a manner that the first worm downwardly discharges the closures that are not correctly oriented and that do not find support on the second worm, the closures being discharged between the first and second worms, and whereby the correctly oriented closures are longitudinally advanced by said first worm and second worm to a use position.

* * * * *